United States Patent
Biskeborn

(10) Patent No.: US 10,832,714 B2
(45) Date of Patent: Nov. 10, 2020

(54) DATA STORAGE CARTRIDGE HAVING A CALIBRATED SERVO FORMAT REGION AND METHODS FOR USING SAME

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/547,439

(22) Filed: Aug. 21, 2019

(65) Prior Publication Data

US 2020/0168246 A1 May 28, 2020

Related U.S. Application Data

(63) Continuation of application No. 16/203,408, filed on Nov. 28, 2018, now Pat. No. 10,475,477.

(51) Int. Cl.
*G11B 5/588* (2006.01)
*G11B 5/584* (2006.01)
*G11B 5/008* (2006.01)

(52) U.S. Cl.
CPC .......... *G11B 5/584* (2013.01); *G11B 5/00813* (2013.01)

(58) Field of Classification Search
CPC .......... G11B 15/46; G11B 15/52; G11B 5/54; G11B 5/58; G11B 5/59665; G11B 5/59655; G11B 5/5848; G11B 5/588; G11B 5/5534; G11B 5/5565

USPC ... 360/73.04, 73.13, 75, 77.01, 77.05, 77.11, 360/77.12, 78.09, 78.14
See application file for complete search history.

(56) References Cited

U.S. PATENT DOCUMENTS

| | | |
|---|---|---|
| 5,629,813 A | 5/1997 | Baca et al. |
| 5,675,448 A | 10/1997 | Molstad et al. |
| 5,819,309 A | 10/1998 | Gray |
| 6,612,499 B2 | 9/2003 | Ellis et al. |
| 6,833,973 B2 | 12/2004 | Chilwnyj et al. |
| 6,903,895 B2 | 6/2005 | Chliwnyj et al. |
| 6,992,857 B2 | 1/2006 | Knowles et al. |
| 7,158,339 B2 | 1/2007 | Kuse et al. |
| 7,280,307 B2 | 10/2007 | Bui et al. |
| 7,391,587 B2 | 6/2008 | Dugas et al. |
| 8,154,811 B2 | 4/2012 | Barsotti et al. |

(Continued)

FOREIGN PATENT DOCUMENTS

EP 616319 A2 9/1994

OTHER PUBLICATIONS

List of IBM Patents or Patent Applications Treated as Related.

(Continued)

*Primary Examiner* — Nabil Z Hindi
(74) *Attorney, Agent, or Firm* — Zilka-Kotab, P.C.

(57) ABSTRACT

A tape cartridge according to one aspect includes a tape formatted with a servo pattern having at least two servo tracks thereon. The tape cartridge having stored therein a value corresponding to a difference between a specified distance between adjacent servo tracks and an average distance between adjacent servo tracks on the tape. The average distance is an average of actual distances between adjacent servo tracks over a portion of the tape. Various computer program products for using such a tape cartridge are also disclosed.

25 Claims, 13 Drawing Sheets

(56) References Cited

U.S. PATENT DOCUMENTS

| | | |
|---|---|---|
| 8,264,789 B2 | 9/2012 | Kawakami et al. |
| 8,526,135 B2 | 9/2013 | Ohtsu et al. |
| 8,654,473 B2 | 2/2014 | Fasen |
| 8,824,083 B1 | 9/2014 | Kientz et al. |
| 9,153,279 B1 | 10/2015 | Nikita |
| 9,361,921 B2 | 6/2016 | Herget |
| 9,536,561 B1 * | 1/2017 | Hasegawa .......... G11B 5/00817 |
| 9,640,208 B2 | 5/2017 | Poorman et al. |
| 10,475,477 B1 | 11/2019 | Biskeborn |
| 2006/0285240 A1 | 12/2006 | Jurneke |
| 2011/0141868 A1 | 6/2011 | Mahnad |
| 2016/0179417 A1 | 6/2016 | Fasen et al. |

OTHER PUBLICATIONS

Biskeborn et al., U.S. Appl. No. 15/986,674, filed May 22, 2018.
Biskeborn R. G., U.S. Appl. No. 16/203,408, filed Nov. 28, 2018.
Notice of Allowance from U.S. Appl. No. 16/203,408, dated Jun. 26, 2019.

* cited by examiner

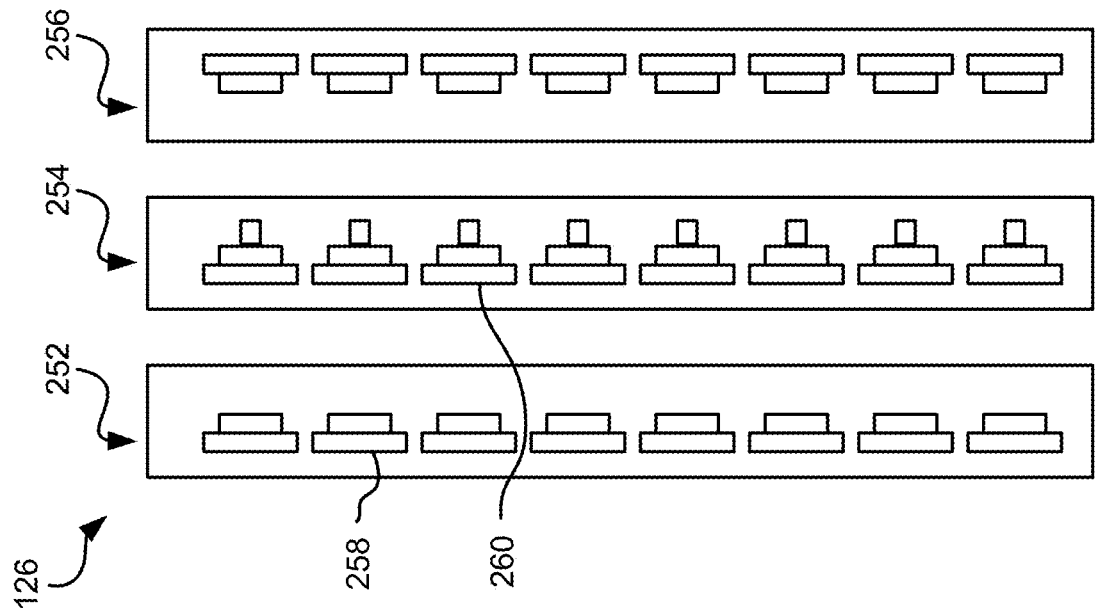
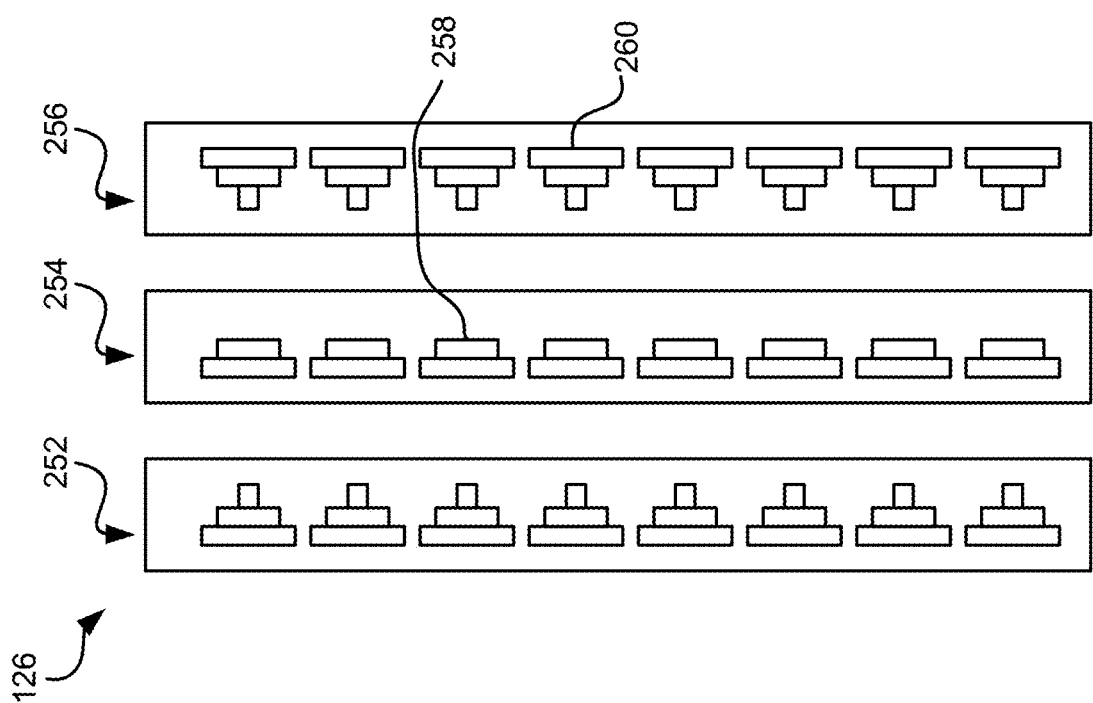

DATA STORAGE CARTRIDGE HAVING A CALIBRATED SERVO FORMAT REGION AND METHODS FOR USING SAME

BACKGROUND

The present invention relates to data storage systems, and more particularly, to a magnetic tape cartridge having calibrated servo spans and methods of using the same.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with misregistration due to tape dimensional instability.

SUMMARY

A tape cartridge according to one aspect includes a tape formatted with a servo pattern having at least two servo tracks thereon. The tape cartridge having stored therein a value corresponding to a difference between a specified distance between adjacent servo tracks and an average distance between adjacent servo tracks on the tape. The average distance is an average of actual distances between adjacent servo tracks over a portion of the tape.

A computer program product of calibrating a tape drive according to one aspect includes taking, by a computer, a measurement of a servo track span of a tape using a module of a tape drive running the tape, where the tape has stored therewith data of an average servo track span of a portion of the tape. The computer program product includes calculating, by the computer, a value by comparing the measured servo track span to the average servo track span, and storing, by the computer, the value in memory.

A computer program product for calibrating a tape according to one aspect includes taking, by a computer, servo track span measurements along a portion of the tape, where the tape has been loaded in a tape drive having a module of known servo reader span. The computer program product includes computing, by the computer, an average of the servo track span measurements, calculating, by the computer, a difference between the average of the servo track span measurements and the known servo reader span, and storing, by the computer, calculated difference in association with the tape.

A computer program product for checking a tape for aging according to one aspect includes taking, by the computer, servo track span measurements along a portion of the tape, where the tape has been loaded in a drive having a module of known servo reader span. The computer program product includes computing, by the computer, an average of the servo track span measurement, comparing, by the computer, the computed average of the servo track span measurements to an average servo track span derived from servo track span data created for the tape at an earlier date, and taking, by the computer, an action in response to a result of the comparing.

Any of these aspects may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and approaches of the present disclosure will become apparent from the following detailed description, which, when taken in conjunction with the drawings, illustrate by way of example the principles of the disclosure.

BRIEF DESCRIPTION OF DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present disclosure and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of magnetic storage systems, as well as operation and/or component parts thereof.

A tape cartridge according to one aspect includes a tape formatted with a timing-based servo pattern having at least two servo tracks thereon. The tape cartridge also includes a persistent memory device having stored therein a value corresponding to a difference between a specified distance between adjacent servo tracks and an average distance between adjacent servo tracks on the tape. The average distance is an average of actual distances between adjacent servo tracks over a portion of the tape. The persistent memory device also stores environmental condition data and drive condition data pertaining to the average distance.

A method of calibrating a tape drive according to one aspect includes obtaining a tape having stored therewith data of an average servo track span of a portion of the tape. A servo track span of the tape is measured using a module of a tape drive running the tape. A value is calculated by comparing the measured servo track span to the average servo track span. The value is stored in memory.

A method of calibrating a tape according to one aspect includes loading a tape in a tape drive, the tape drive having a module of known servo reader span. Servo track span measurements are taken along a portion of the tape. An average of the servo track span measurements is computed. A difference between the average of the servo track span measurements and the known servo reader span is calculated. The calculated difference is stored in association with the tape.

A method for checking a tape for aging according to one aspect includes loading a tape in a drive having a module of known servo reader span, and taking servo track span measurements along a portion of the tape. An average of the servo track span measurements is computed. The computed average of the servo track span measurements is compared to an average servo track span derived from servo track span data created for the tape at an earlier date. An action is taken in response to a result of the comparing.

Figure 1A:
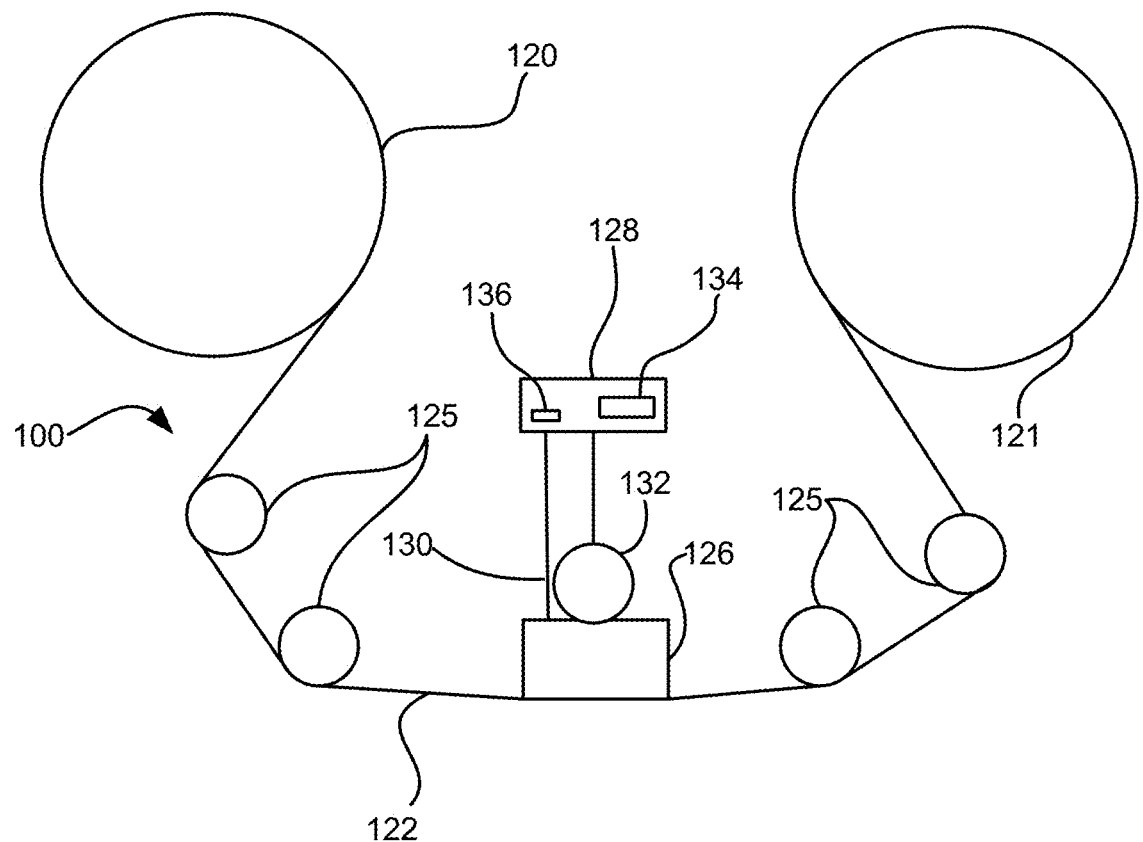
FIG. 1A is a schematic diagram of a simplified tape drive system according to one aspect.

FIG. 1A illustrates a simplified tape drive 100 of a tape-based data storage system, which may be employed in the context of the present disclosure. While one specific implementation of a tape drive is shown in FIG. 1A, it should be noted that the aspects described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
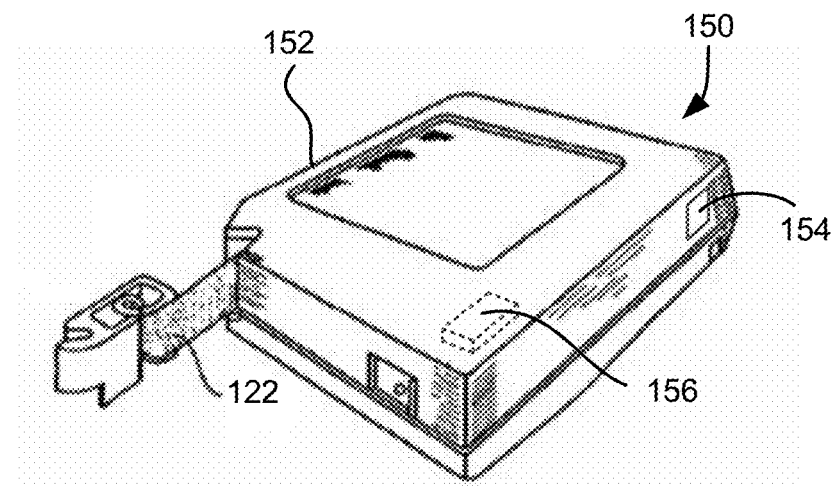
FIG. 1B is a schematic diagram of a tape cartridge according to one aspect.

FIG. 1B illustrates an exemplary tape cartridge 150 according to one aspect. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
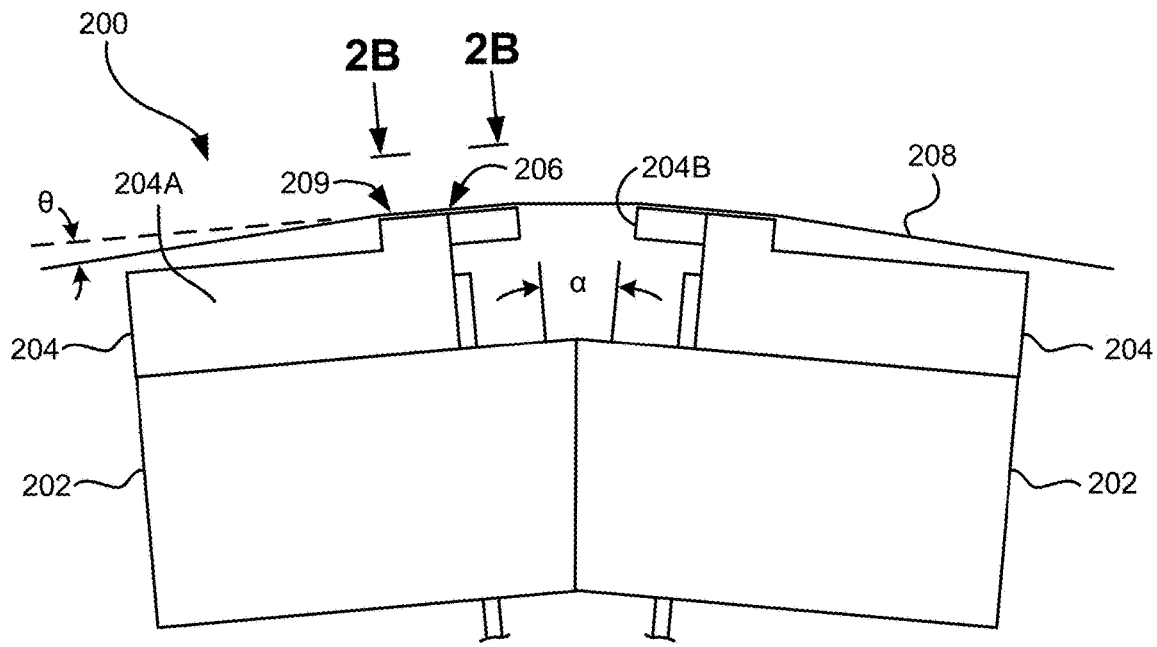
FIG. 2A illustrates a side view of a flat-lapped, bi-directional, two-module magnetic tape head according to one aspect.

By way of example, FIG. 2A illustrates a side view of a flat-lapped, bi-directional, two-module magnetic tape head 200 which may be implemented in the context of the present disclosure. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
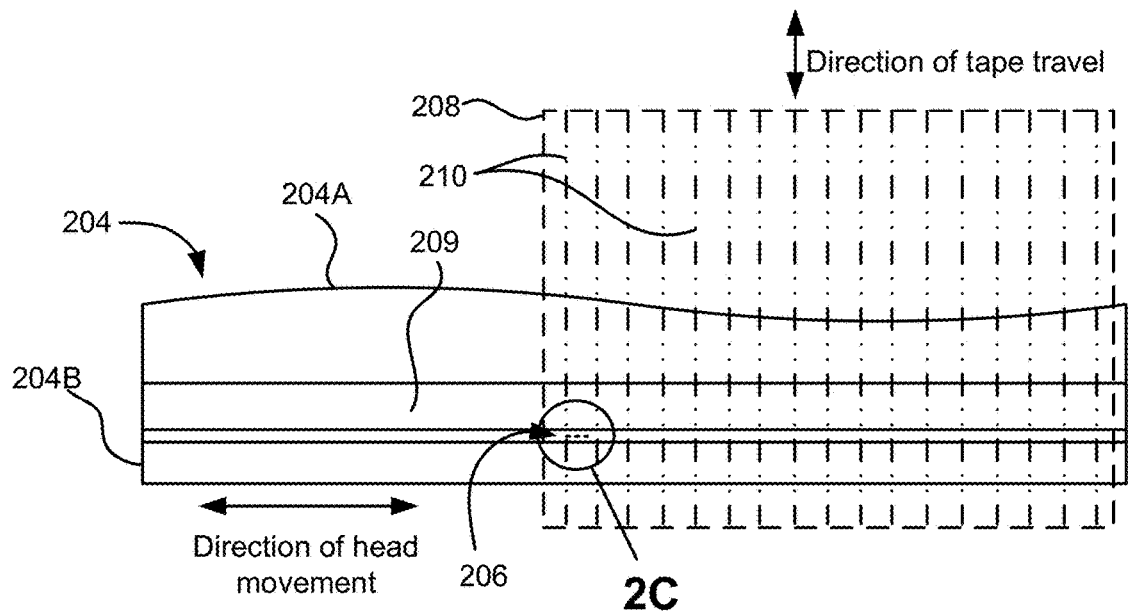
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
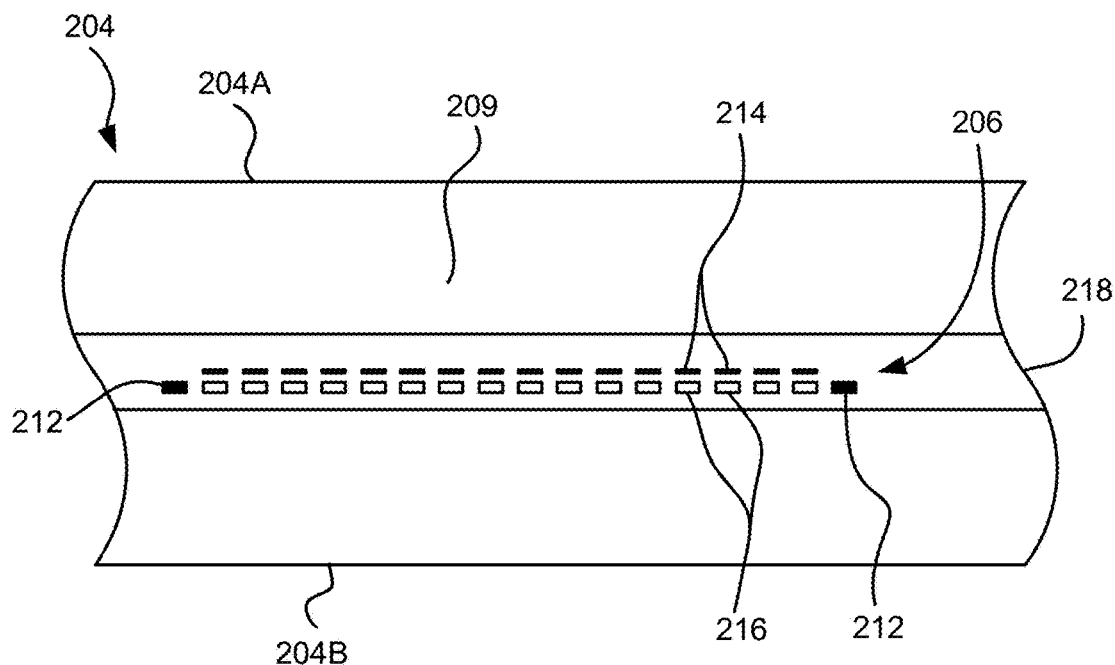
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
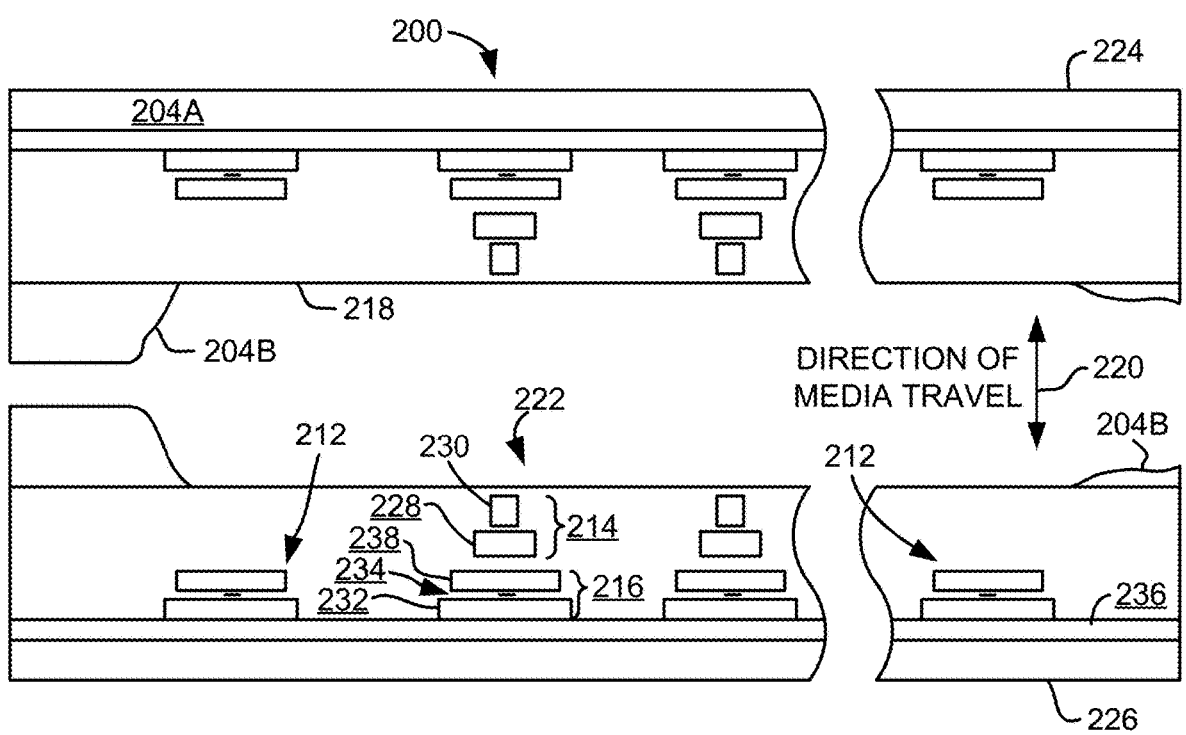
FIG. 2D is a detailed view of a partial tape bearing surface of a pair of modules.

FIG. 2D shows a partial tape bearing surface view of complementary modules of a magnetic tape head 200 according to one aspect. In this aspect, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form a R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one aspect includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present disclosure. One skilled in the art apprised with the teachings herein will appreciate how permutations of the present disclosure would apply to configurations other than a W-R-W configuration.

Figure 5:
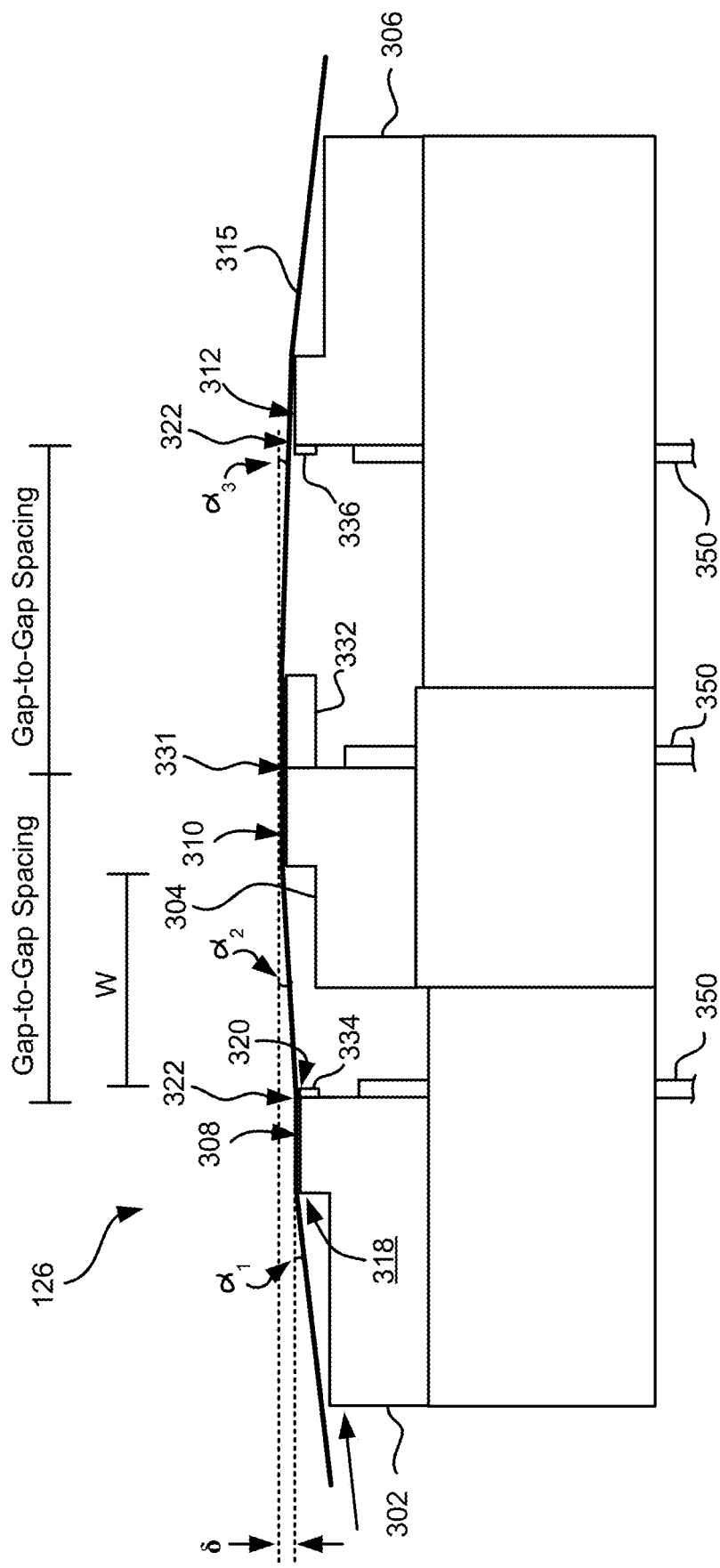
FIG. 5 is a side view of a magnetic tape head with three modules according to one aspect where the modules all generally lie along about parallel planes.

FIG. 5 illustrates a magnetic head 126 according to one aspect of the present disclosure that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
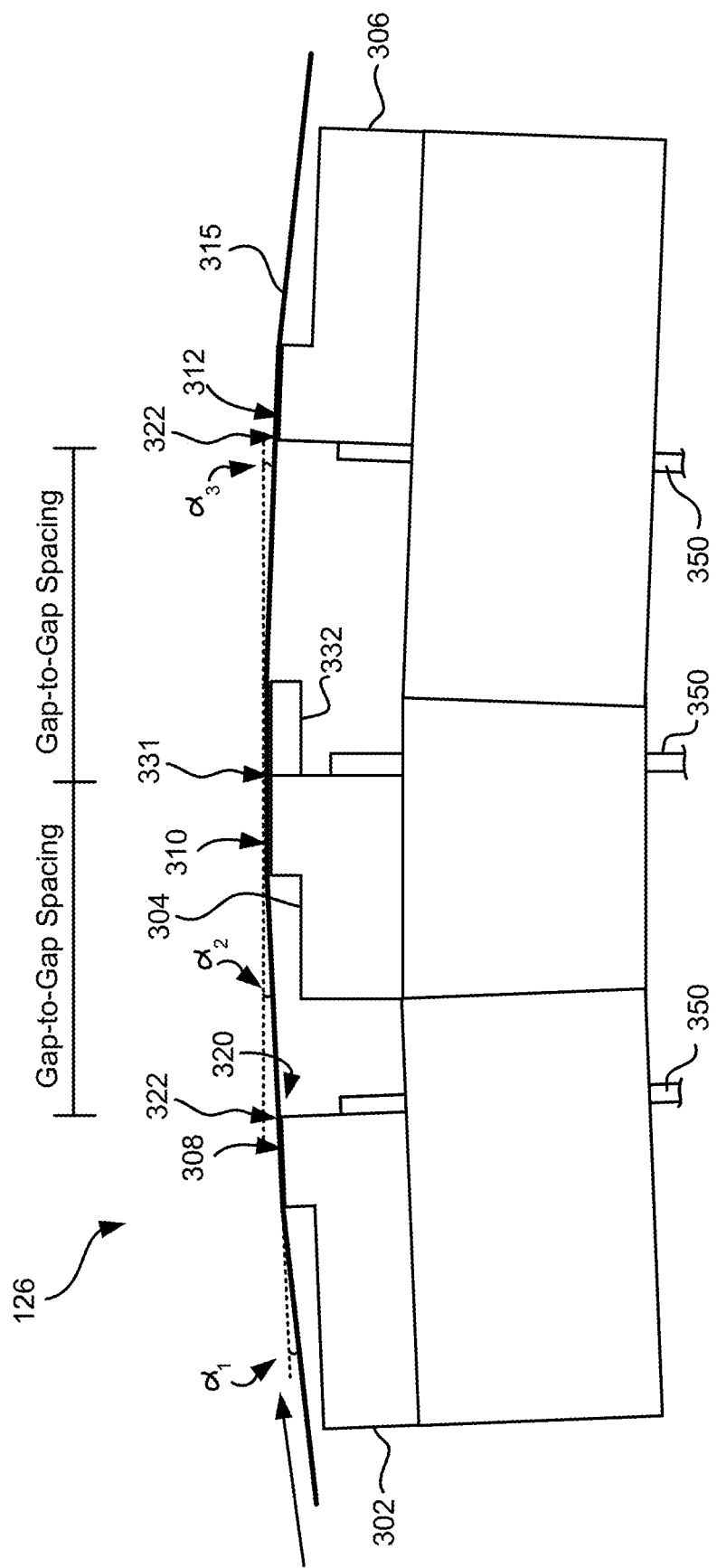
FIG. 6 is a side view of a magnetic tape head with three modules in a tangent (angled) configuration.

In one aspect, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other aspects described herein is that, because the outer modules 302, 306 are fixed at a determined offset from the second module 304, the inner wrap angle $\alpha 2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one aspect, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
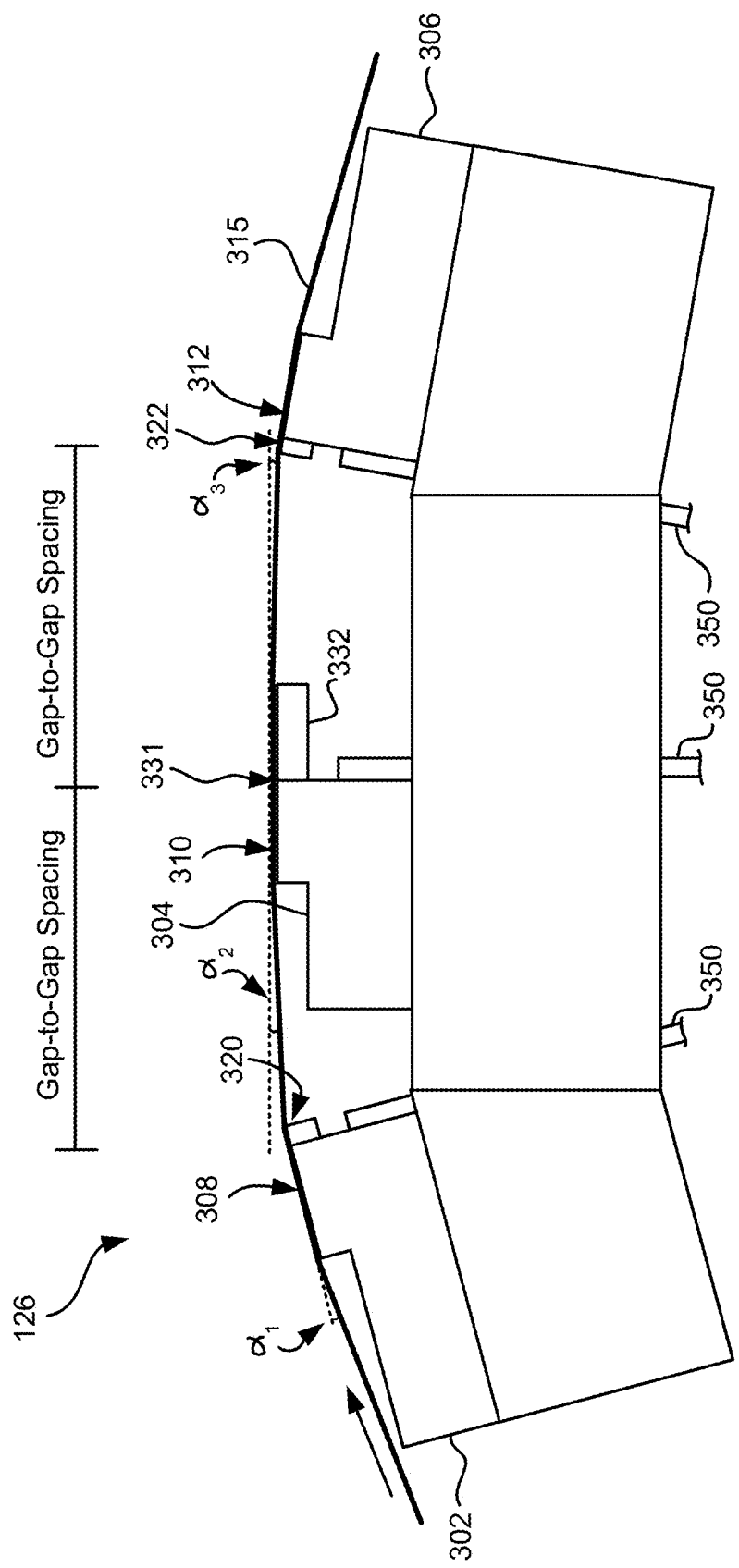
FIG. 7 is a side view of a magnetic tape head with three modules in an overwrap configuration.

FIG. 7 illustrates an aspect where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this aspect, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various aspects in conformance with the teachings herein, as would become apparent to one skilled in the art upon reading the present disclosure.

Figure 8A:
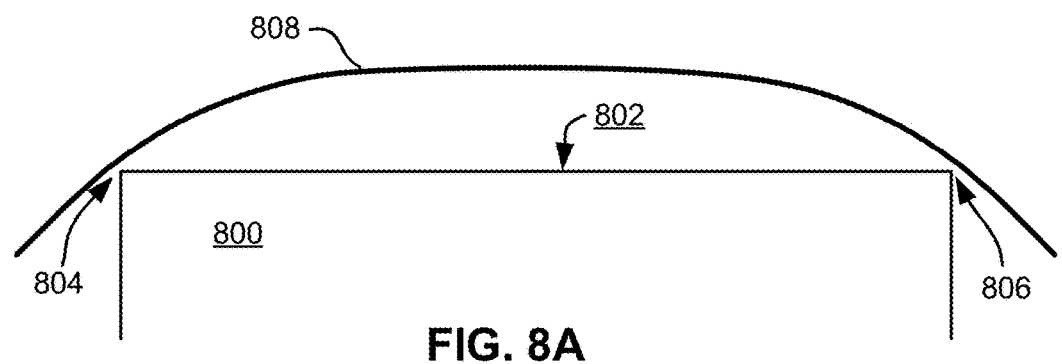
FIGS. 8A-8C are schematics depicting the principles of tape tenting.
Figure 8B:
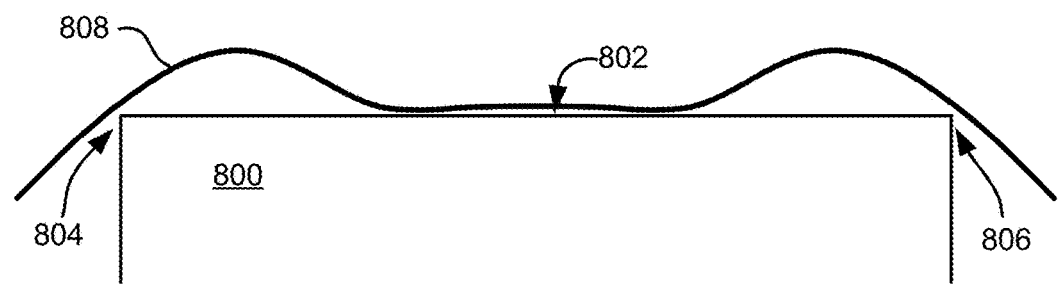
Figure 8C:
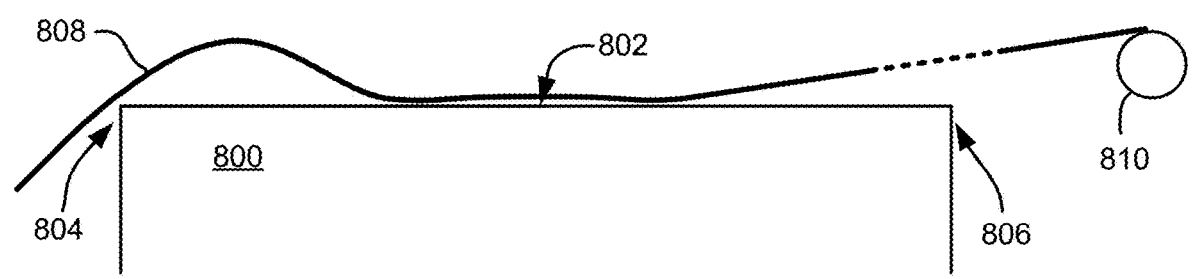

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various aspects herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
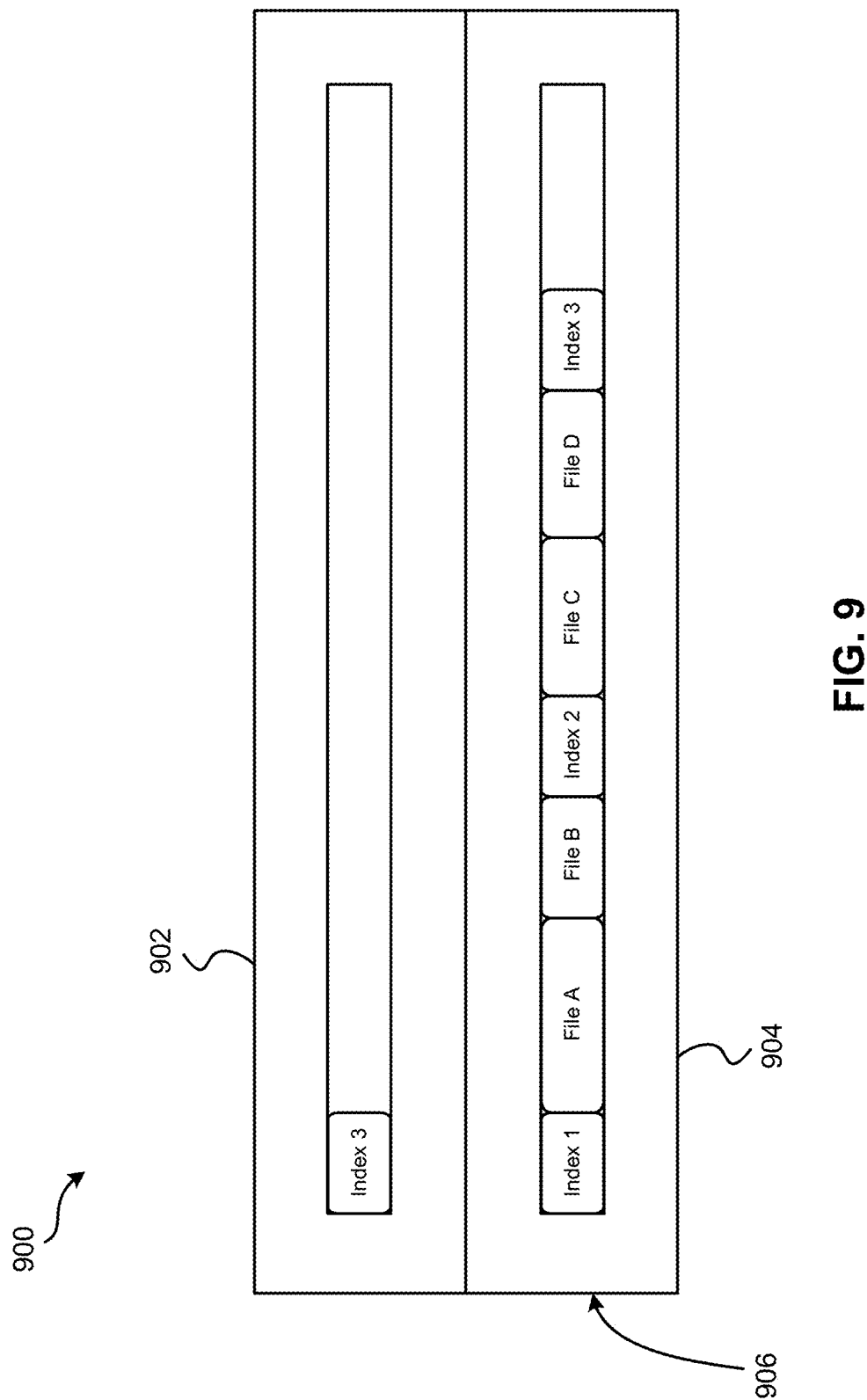
FIG. 9 is a representational diagram of files and indexes stored on a magnetic tape according to one aspect.

Looking to FIG. 9, a magnetic tape 900 having an index partition 902 and a data partition 904 is illustrated according to one aspect. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the disclosure, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

It is known that conventional tape drives may have difficulty reading tapes that were written and then stored. The cause of this has been found to be due to a mis-registration between outermost tracks in head modules and tracks recorded on tapes prior to storing the tapes.

It is also now known that pitch between recording elements may not be the same for all modules. There has been an assumption in the industry, that element pitch is essentially perfect in each head module, e.g., the pitch matches wafer photo masks. However, recent data indicate element pitch may vary by up to 150 parts per million (ppm) from module-to-module and, as such, may contribute significantly to the aforementioned mis-registration. For modern head modules, which use timing-based servo processes, pitch variation of, for example, 200 ppm translates to, for example, a 572 nanometer variation in an exemplary 2859 µm separation between servo readers 1 and 2.

Figure 10:
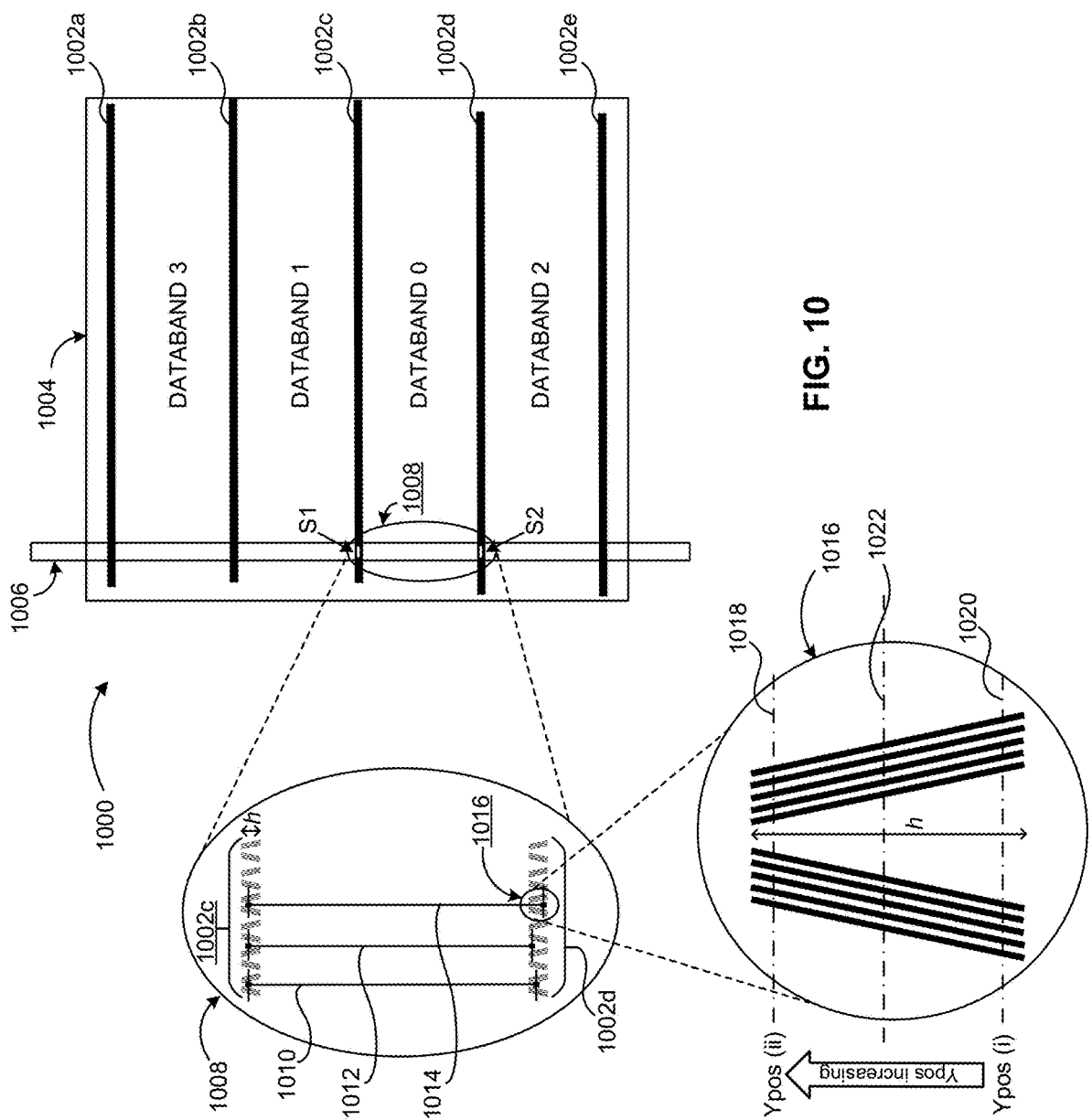
FIG. 10 is a schematic showing a magnetic recording head having an ideal, a narrower, and a wider span between servo readers, according to one approach.

FIG. 10 is a schematic of an ideal head and tape, showing a magnetic recording head 1006 having an ideal, a narrower, and a wider span between servo readers S1 and S2 band an ideally servo-formatted tape having a perfect pattern. The magnetic recording head 1006 is part of an apparatus 1000 for reading a magnetic recording tape 1004 having four databands and five timing-based servo patterns. As shown, the magnetic recording tape 1004 has 5 timing-based servo patterns 1002a, 1002b, 1002c, 1002d, 1002e. Each set of adjacent timing-based servo patterns flank a respective databand, for example, databand 0 has timing-based servo patterns 1002c and 1002d along databand 0.

Oval 1008 shows a magnified view of the timing-based servo patterns 1002c, 1002d associated with databand 0 of the magnetic recording tape 1004 as read by servo readers S1, S2 of the magnetic recording head 1006. The distance between S1 and S2 of the magnetic recording head may have a specification of 2859 µm. The height h of each timing-based servo chevron pattern 1002a, 1002b, 1002c, 1002d, 1002e on the magnetic recording tape 1004 is 93 µm. The chevron angle is 12 degrees in the example shown. A distance between each centerline of the servo pattern (e.g., centerline 1022 of a single servo pattern of circle 1016) read by each servo reader S1, S2 of a perfect tape. Thus, from the position of the servo reader S1, S2 on the timing-based servo pattern 1002c, 1002d, the head span may be measured relative to the servo patterns on the tape.

Circle 1016 of FIG. 10 is a magnified view of a single chevron set of a servo pattern being read by servo reader S2. A Y position (Ypos) value may be determined by the servo reader S2 on the chevron servo pattern. A convention is when a servo reader, for example, S2, moves up the chevron servo pattern, the Ypos value increases. Thus, a Ypos value nearer the Ypos (ii) region 1018 of the servo pattern is greater than a Ypos value near the Ypos (i) region 1020 of the servo pattern. A Ypos value is measured for each servo reader S1, S2 relative to the position of the servo reader on the servo pattern.

The relationship between the servo readers in the head and the servo tracks on the tape may be expressed as a difference or "delta" between value of the Ypos values for each servo reader, according to Equation 1.

$$\Delta Ypos = Ypos\, S1 - Ypos\, S2 \qquad \text{Equation 1}$$

A head having perfect span reading a perfect tape would have a $\Delta Ypos=0$, in other words, each servo reader is positioned at the same location in the relative servo track. Thus, the $\Delta Ypos$ is relative to the head span 1010 of oval 1008.

A head span contracted relative to the tape (or the tape expanded relative to the head span) would have a $\Delta Ypos<0$, in other words, servo reader S2 is nearer the 1018 position on the servo track. Thus, the $\Delta Ypos$ is relative to the head span 1012 of oval 1008.

A head span expanded relative to a tape (or the tape contracted relative to the head span) would have a $\Delta Ypos>0$, in other words servo reader S2 is nearer the 1020 position on the servo track. Thus, the $\Delta Ypos$ is relative to the head span 1014 of 1008.

From the foregoing discussion, it is evident now that transducer spans may vary from head to head due to wafer and/or post wafer stress distributions. In addition, spacing between adjacent timing-based servo tracks on media has a relatively large tolerance of, say, +/−4600 nanometers (the current LTO specification), which is greater than the head span itself. Furthermore, not only has the head span not been previously measured, nor has the servo tracks span. Measurements were not needed. Moreover, servo track span has not been the subject of direct measurements due to difficulties in performing such a measurement. In fact, the only known way to measure servo tracks span on tapes was by measuring delta Ypos using a head having a not accurately known span.

This led to a need for a method to accurately measure head spans. If head span is known for at least a characterization head, then this head may be used to accurately characterize servo spans on tapes. The way servo span on tape is determined is by reading delta Ypos using the characterization head and computing the servo span, which is thus:

[tape servo span]=[servo span of characterization head]+[delta Ypos measured by this head]   Equation 2

For convenience, hereinafter, servo track span (between adjacent servo tracks), depending on the context, refers either to the absolute span, e.g. 2858.8 μm or the delta Ypos as measured by a head having a known servo span, as will become evident in the specification.

By way of example, it is not unusual to find delta Ypos variation down the length of a tape of 1000 nm or more. For most tapes, delta Ypos decreased from beginning of tape (BOT) to end of tape (EOT) because the tapes are wider near the cartridge hub, as explained above. Furthermore, delta Ypos is strongly databand-dependent and varies significantly from tape to tape. In the end, the only accurate measurement for servo track span on tapes is to use calibrated heads (as per the teaching herein) and measure delta Ypos. It is thus possible, but not required, to convert this information into servo tracks distance, because in the end only delta distances are needed. But it is convenient to use the difference between delta Ypos values and servo tracks span interchangeably.

Moreover, increasing track density and tape cartridge capacity for future generations of tape drives and tape cartridges may significantly limit readability of tape even though improvements have been made to minimize creep characteristics of media. While head span variation is believed to arise from a combination of wafer design and/or fabrication details, so far only tape tension control addresses compensation of module-to-module variation and the effects of media creep. However, tension control of the tape may not always provide sufficient range to address mis-registration for tape interchange.

According to various approaches described herein, a memory in the tape drive contains information pertaining to the spans of modules of the tape drive. This information stored in the tape drive memory enables screening, quality tracking, tape initialization, and/or other performance attributes of the modules and/or tape run on the modules. Conventional tape drives do not include a provision or programming to store information pertaining to the spans of the modules of the same tape drive. Embodiments described herein can enable tape initialization processes for data cartridges prior to storing data thereon, which in turn may enable cartridge capacity growth for at least another generation.

In one aspect, an apparatus includes a module having an array of transducers having at least two transducers and a persistent memory that includes data of a span of the array of transducers at a particular temperature. In one approach, the at least two transducers include servo readers, where the span is the distance between two servo readers.

In one aspect, an apparatus includes a plurality of modules, each module having an array of transducers having at least two transducers, and a persistent memory comprising data of spans of the arrays of transducers at a particular temperature.

A particular temperature may be the temperature at the time the measurements were taken, a known temperature, a predetermined temperature, etc. Since a head in general expands/contracts with increases/decreases in temperature, it is desirable to determine the known head span at that particular temperature. For example, and not meant to be limiting, an aluminum oxide-titanium carbide wafer material, on which thin films head are deposited, and from which closures are fabricated, has a non-zero coefficient of thermal expansion, a typical value being approximately 7.8 ppm/° C. Thus, a temperature change of one degree Celsius (° C.) induces a servo-servo separation distance of approximately 22.3 nanometers. Consequently, a 10° C. degree temperature change may result in a 223 nanometer change in span. Thus, it is highly desirable to maintain a constant or predetermined temperature for all measurements of the span.

In one approach, the span may be measured between centerlines of the respective centerlines of the respective servo readers. Equivalently, the span can be the distance between facing ends of the servo readers. In one approach, the centerlines may be geometric centerlines. In another approach, the centerlines may be magnetic centerlines.

In one approach, the span is the distance between distal data readers of the array of transducers. For example, the distal data readers may be the outermost data readers, and/or data readers positioned toward the ends at known location.

In another approach, the span is the distance between outer data writers of the array of transducers. For example, the outer data writers may be the outermost data writers, or data writers positioned toward the ends at known location. In one approach, the span may be measured between respective centerlines of the data writers. In another approach, the span may be measured between shingling edges of the data writers. The shingling edges are the edges that define the edge of the written shingled track.

In one approach, the spans are within a specified range. If a span falls outside the range, the module corresponding thereto may be rejected. In one approach, the spans are traceable to a standard value. The standard value can be defined by a standard, e.g., 2858.8 microns. In another approach, the spans may be within 50 nm of the standard value, more preferably within 20 nm.

In one approach, the data includes a relative head span, the relative head span being the difference between the span of the array of transducers and a target span of an array of transducers at a particular temperature. In one approach, the span of the array is the length between a first servo reader and a second servo reader in a direction parallel to the array of transducers. In one approach, the span is the length between servo 1 and servo 2 in a direction parallel to the array of transducers. A module may have 2, 3, 4, etc. servo readers of an array of transducers. In one approach, the span is the length between a second of the servo readers and a third of the servo readers in a direction parallel to the array of transducers. In another approach, the span is the length between innermost servo transducers positioned at each end of the array, e.g., in an approach having multiple servo readers at each end of the array. In a further approach, the span is the length between outermost transducers positioned at each end of the array.

In a preferred approach, a tape drive may have a region of persistent memory contained therein. Looking back to FIG. 1A, the memory 136 may comprise a persistent memory of or coupled to the controller 128 of the tape drive 100. In one approach, the apparatus has a persistent memory that includes vital product data (VPD) stored therein. In one approach, data of the spans may be stored with VPD. Storing span data with and/or in the VPD in persistent memory is advantageous because the data of the spans may be more readily accessible.

In another approach the apparatus has a persistent memory located in a radio frequency identification device (RFID) associated with the apparatus. In another approach, the apparatus has a persistent memory located in an inter-integrated circuit (I2C) memory device associated with the apparatus. For example, looking back to FIG. 1A, an I2C memory device or the RFID may be attached to a cable 130 of a tape drive 100. In one approach, the apparatus has a persistent memory in a cable associated with the apparatus. In another approach, the data of the span of the array of transducers may be stored in a database, memory in a data library, etc. These approaches are by way of example only and are not meant to be limiting in any way.

The region of persistent memory may contain information pertaining to the span of an array of transducers for each module at a particular temperature.

In some approaches, the target span may be a reference value of a specification of the module. For example, but not limited to, a target span value may be related to the conventional timing-based servo head module specification of 2859 μm (e.g., LTO and Enterprise products).

In some approaches, the target span may be obtained from a memory region of a calibrated magnetic recording tape.

In some approaches, the target span may be an average span derived from a plurality of modules. In one approach, the target span may be derived from the average span of a statistically large sample of head modules. A large sample of head modules may include 20+ modules, 50+ modules, 100+ modules, 150+ modules, 200+ modules, 250+ modules, 500+ modules, 1000+ modules, 10000+ modules, etc., and the number of modules may be higher or lower. Various approaches described herein may be used to determine the average span from a large sample of modules.

In one approach, the target span is an average span that includes an average of measurements of physical spans of a plurality of modules at a particular temperature. The known temperature can be the particular temperature, assuming all other spans were measured at that particular temperature. The particular temperature at the time of measurements may be referenced and stored in the persistent memory of the tape drive.

In various approaches, the physical span of an array on a module at a known temperature may be measured using a mechanical calibration device. For example, atomic force microscopy may be used. In another approach, a conventional optical technique may be used to measure the span of each array.

In some approaches, the average span may be an average of a plurality of measurements of magnetic spans of a plurality of modules derived from reading timing based (or other) servo tracks of a magnetic recording media having known servo track span at a known temperature, humidity and tension. If the servo track span is known, then the actual span for each module can be readily determined using known techniques.

In one approach, the measurement of a magnetic span is a measurement of a span of data written to a magnetic recording medium by a calibrated writing module at a known temperature, humidity and tension.

In some approaches, calibration data may include servo band difference (SBD) measurement itself and/or information derived from the SBD measurements. To measure SBD, servo readers on the same module read respective servo patterns on the media. In the ideal case, both servo readers would measure the same position on their relative servo pattern. However, media and heads are rarely ideal, and therefore any deviation from this ideal case can be determined by comparing the position measurements from the two servo channels.

In one approach, the target span is an average span derived from a plurality of modules comprising readers and no writers. In another approach, the target span is an average span derived from a plurality of modules comprising writers and servo readers and no data readers.

In various approaches, the persistent memory of an apparatus may include a plurality of spans corresponding to the apparatus. In one approach, the apparatus includes a first module and a second module where the first module is different than the second module. In one approach, an apparatus includes a reader module and a writer module, where a span of the reader module and a span of the writer module are stored in the persistent memory. Further, the span of the reader module may be the same as or different from the span of the writer module. Moreover, the spans of the modules in a given drive may be within 50 nm of one another.

In one approach of an apparatus having a first module and a second module, the span of the first module and the span of the second module are stored in the persistent memory. The first module may be used in a first tape direction, and the second module may be used in a second tape travel direction opposite the first tape travel direction, and the span of the first module is different from the span of the second module.

Each of the steps of the method may be performed by any suitable component of the operating environment. For example, in various approaches, the method may be partially or entirely performed by a tape drive, or some other device having one or more processors therein, in conjunction with a calibrated tape. The processor, e.g., processing circuit(s), chip(s), and/or module(s) implemented in hardware and/or software, and preferably having at least one hardware component may be utilized in any device to perform one or more steps of the method. Illustrative processors include, but are not limited to, a central processing unit (CPU), an application specific integrated circuit (ASIC), a field programmable gate array (FPGA), etc., combinations thereof, or any other suitable computing device known in the art.

This process may be performed when a new module is being prepared for first use. For example, this process may be added to a conventional apparatus and/or module initialization process.

According to one approach, the method may initiate with identifying a module of an apparatus, where the apparatus includes a persistent memory and the module having an array of transducers and at least two servo readers.

In one approach, the target span is a reference value of a specification of the module. For example, in one approach, for a conventional timing-based servo head specification, the target span is 2858.8 microns.

In some approaches, the target span may be an average span derived from modules of a plurality of tape drives. In one approach the average span is an average of measurements of a physical span of each of a plurality of modules at a known temperature, a predetermined temperature at which each measurement is taken such that the plurality of measurements were taken at the same temperature. In some approaches, the physical span is measured with a mechanical calibration device.

In another approach, the average span may be an average of a plurality of measurements of magnetic spans of a plurality of modules derived from a servo reading magnetic recording media having known servo track span at a known temperature, humidity and tension.

The method includes an operation of storing the span of the module in the persistent memory for calibrating media to be run over the module.

The SBD measurements and/or derivatives thereof (collectively referred to herein as "calibration data") are stored in association with the persistent memory of the module.

Note in conventional systems, servo reader pitch varies from head to head, and therefore, the raw SBD measurements may not typically reflect the actual servo track spacing. Said another way, wider or narrower servo pitch on the head than the assumed pitch causes an error in the measurement of the current media spacing value. Accordingly, the span of the module determined by the method described provides the information to confirm the pitch of the servo readers on the head is known and can be used to adjust (compensate) the SBD values so that the SBD values more accurately reflect the actual media spacing characteristics. The pitch of the servo readers corresponds directly to the spacing of the servo readers relative to each other, and may be center-to-center pitch, edge-to-edge pitch, etc.

The pitch of the servo readers relative to the span of the module may be derived or obtained by methods described herein. Typically, this value is stored in the memory of each drive during manufacture thereof. In one approach, the pitch is measured for each drive at manufacturing and placed in a non-volatile area of drive memory such as with the vital product data (VPD). This head calibration can be performed in multiple ways, such as measurement with an atomic force microscope (AFM) using stages, the use of a reference tape having servo tracks of known spacing, or any other method which provides a measurement of transducers relative to other transducers. In another approach, the pitch is measured for a drive after the drive has been built, and optionally in use. In a preferred approach, a reference tape may be used.

By using the pitch value stored in the VPD, a new tape may be characterized and the measurements observed may be compensated according to the head spacing value stored in VPD, thus ensuring that the measurements taken, and corresponding values ultimately written to the cartridge memory (CM), are representative of the cartridge, and not unduly influenced by the head making the measurement.

Additionally, by using temperature and/or humidity sensors in the drive (and/or external sensors with information communicated to the drive), the effects of the local temperature and/or humidity can also be compensated for. For example, if the humidity is high, then tape expands and the cartridge is initialized at this high humidity condition. It is desired that the stored SBD values represent a nominal condition in head spacing, temperature, and humidity.

The method described herein may be performed as part of a cartridge initialization procedure. For example, in addition to performing conventional special operations during the first load of a brand-new cartridge, the operations of the method may be performed during the cartridge initialization process.

The temperature at the time of measurements may be referenced and stored in the persistent memory of the tape drive.

In some approaches, there may be more than one target span for a tape drive. For example, a target span of a reader module may be systematically different than the target span of a writer module. All target spans of all versions of the module may be stored in the persistent memory of the tape drive.

In one approach, a tape cartridge includes a tape formatted with a timing-based servo pattern having at least two servo tracks thereon. The tape cartridge also has a persistent memory device having stored therein a value corresponding to the difference between a specified distance between adjacent servo tracks (e.g., the LTO specification) and an average distance between adjacent servo tracks on that tape. The average distance is an average of actual distances between adjacent servo tracks over a portion of the tape. Moreover, the persistent memory may also store environmental condition data and drive condition data pertaining to the average distance, as well as region information such as wraps, data bands, etc. and usage counts.

In one approach, the specified distance is a specification. In one approach, the specified distance may be a LTO-defined distance, which is currently 2858.8±4.6 microns. The actual distances between the servo tracks can be derived from the Ypos and a known head span of the head reading the servo tracks. The actual distances may correspond, for example, to centerlines of the adjacent servo tracks in one approach, but may be anywhere as the ΔYpos is independent of Ypos itself.

In one approach, the portion may be a length of the tape that is shorter than the total length of the tape. For example, the length is preferably less than ⅔ of the tape, more preferably less than ½ the length of the tape. This avoids using the ends of the tape, where the servo span spacing is observed to change rapidly with tape length primarily due to creep effects. Moreover, the total length of the tape is preferably shorter than the total length of a conventional data tape. In an exemplary approach, a total length of the tape is less than about 400 meters, but could be longer in some approaches. This also helps to reduce creep effects due to distribution of radial and tangential stresses in the stored tape cartridge. Media creep, (also known in the art as "aging"), tends to occur over time when a tape is wound around a hub of a tape cartridge. In particular, two ends of the tape exhibit creep in different ways. The inner wraps of tape positioned closest to the cartridge hub tend to expand laterally over time due to the compressive stresses exerted thereon by the cumulative effects of the wraps of tape wound around them. Wraps positioned toward the outer diameter of the spool of tape are under significantly less compressive stress, and so tensile stresses tend to dominate, which tends to cause lateral contraction of the tape according to Poisson's relationship, i.e., the tape becomes narrower over time. Accordingly, the ends of the tape exhibit oppositely-oriented lateral dimensional changes.

Preferably, a shorter length of the tape may be used to reduce stresses that cause creep. Additionally, shorter lengths of tape may result in shorter calibration run time.

In one approach, the value may be for a single data band. In a preferred approach, the single data band is an inner data band flanked by other data bands, e.g., DATABAND 0 or 1 in FIG. 10, which is less susceptible to changes in tape dimensions due to possible non-uniform stresses toward the tape edges.

In one approach, the value is for a single wrap in the single data band along the portion of the tape. In one approach, the value may be for a predefined number of wraps in the single data band along the portion of the tape. The predefined number of wraps may be greater than one and preferably two.

In one approach, the portion of the tape is positioned along a neutral area of the tape. The neutral area of the tape is generally defined as that portion of the tape that exhibits the least amount of aging effects, such as tensile creep near the outer diameter of the cartridge and compressive creep near the hub of the cartridge.

In one approach, the servo pattern includes encoding for delimiting the length of the tape. The encoding may be of any type, such as a known pattern, a blank section, etc.

In one approach, the data corresponds to the average of difference between the Ypos values derived from the timing read back by servo reader one and servo reader two.

In one approach, the environmental conditions data pertaining to average distance includes information about conditions during tape calibration. For example, the environmental conditions data may include temperature and/or relate or absolute humidity. The tape width may change with changing temperature, humidity and tension. Therefore, the value stored is relative to the temperature, humidity, tape tension, etc. Knowing this conditions information enables corrections to computations when the tape is used at a different temperature, absolute or relative humidity, and/or tension.

In one approach, the drive condition data pertaining to average distance includes tape tension.

In one approach, the servo track span of the tape may be based on and derived from an average of servo reader span measurements of a plurality of modules. In another approach, the servo track span of the tape may be a derived from a servo reader span of a module calibrated to a standard value. The actual servo reader span may be measured in the tape drive using an AFM or the like, or by any procedure described above.

In one approach, the data includes coefficients for rates of change of the specified distance with at least one condition of the following: temperature, humidity and tape tension. For example, at the time the tape is used, a correction may be made to account for the different conditions compared to the temperature used at calibration, e.g., the current temperature may be different than that stored in the cartridge. Note that head span itself is a known function of temperature. This knowledge may be used to determine media coefficients for temperature and humidity.

In a preferred approach, the tape may have a substrate that includes aramid. Aramid is less sensitive to environmental changes than polyethylene naphthalate (PEN) or polyethylene terephthalate (PET). In addition, width of Aramid tapes is a less sensitive function of tension, making Aramid a preferred substrate for tapes described herein. Moreover, for Aramid, the coefficient for humidity variation is between approximately 3-4 ppm per degree C., which is significantly less than for PEN and PET tapes.

The method of calibrating a tape drive may include a specification such as a number of iterations needed for convergence, etc.

Figure 11:
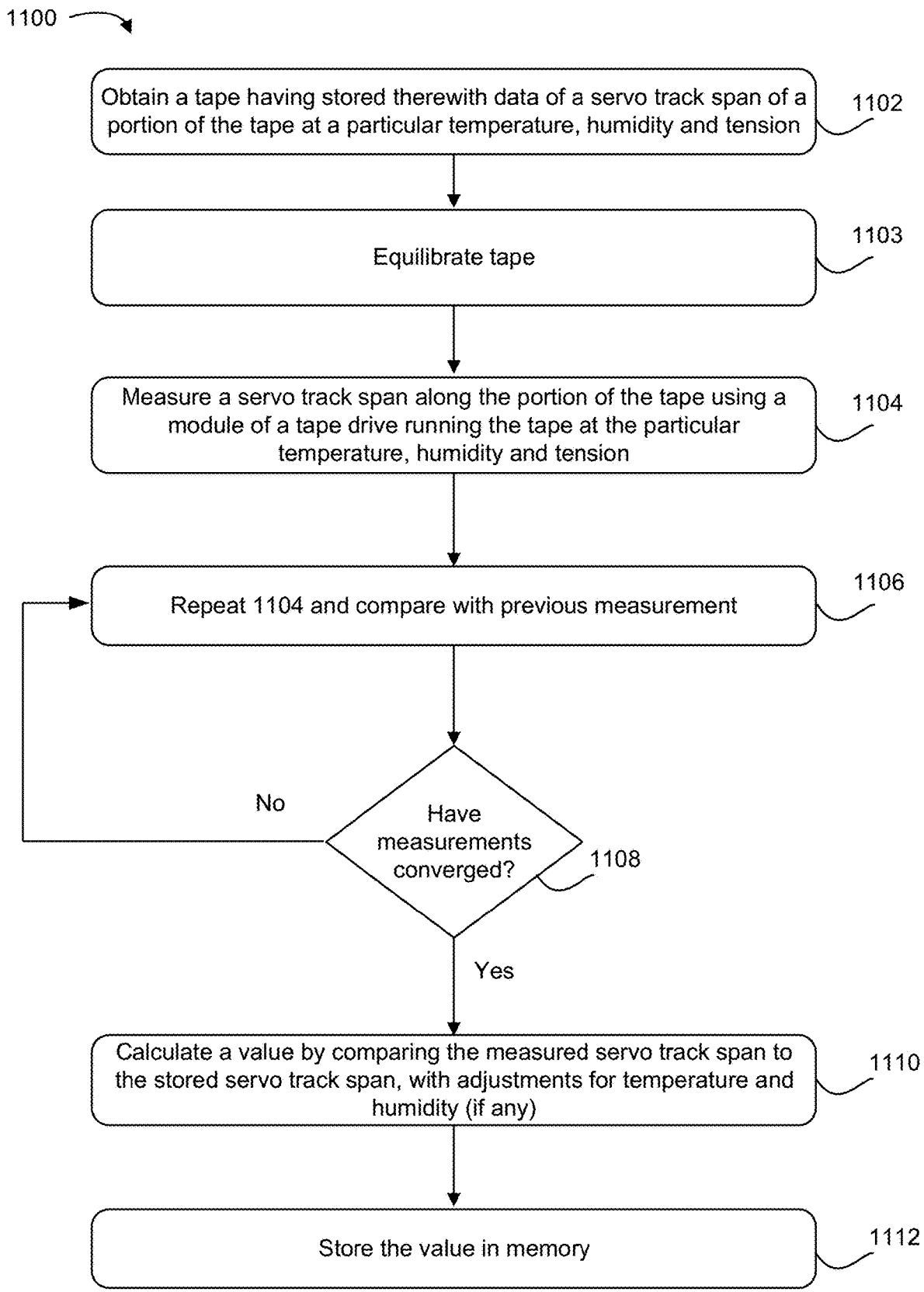
FIG. 11 is a flow chart of a method, according to one approach.

Now referring to FIG. 11, a flowchart of a method 1100 for calibrating a tape drive is shown according to one aspect. The method 1100 may be performed in accordance with the present disclosure in any of the environments depicted in FIGS. 1-10, among others, in various approaches. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various approaches, the method 1100 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where a tape cartridge is obtained having stored therewith data of an average servo track span of a portion of the tape as measured at a particular temperature, humidity, and tension. In one approach, the data includes an average of servo track span along a tape. An average of the servo track spans along a tape is preferred because the span changes along the length of the tape. In some approaches, the data may be stored in a memory coupled to the tape such as a cartridge memory, on the tape itself, on a remote server, etc.

Optional operation 1103 of method 1100 includes equilibrating the tape, such as by heating the tape cartridge to the temperature noted in operation 1102, allowing the tape to acclimate to the present humidity (which is preferably about the humidity noted in operation 1102. In another approach, the present temperature and humidity may be measured, and a correction factor applied to correlate subsequent measurements of servo track span to the data stored in the tape cartridge.

Operation 1104 includes measuring a servo track span of the tape using a module of a tape drive running the tape. In various approaches, each module may be different (and the present module may be different than the module used to create the data of the average servo track span stored in the cartridge). Thus, the servo track span measured by the module is typically different than the value stored in the tape.

Operation 1106 includes repeating operation 1104 at least once, and comparing the two measurements.

At decision 1108, a determination is made as to whether the measurements compared in operation 1106 have converged to within a predefined range, e.g., a difference between the measurements is below a predefine value such as 5 nm.

Operation 1110 includes calculating a value (e.g., an offset value) by comparing the measured servo track span to the average servo track span obtained from the cartridge in operation 1102. The calculation may include making adjustments to correct for difference in temperature, humidity and tension (if any) during the current measurement vs. the temperature, humidity and tension corresponding to the average span data stored in the cartridge, and corresponding to the cartridge calibration conditions.

Operation 1112 includes storing the value in memory, e.g., a memory of the tape drive, in a database of a tape library, etc. This value provides a reference value for the servo reader span of the tape drive. In one approach, the value may be used to then initialize tapes, as the servo reader span of the tape drive is now known (calibrated).

According to one aspect, a method includes making calibrated tapes to calibrate a plurality of tape drives, e.g., a plurality of factory tape drives. Now referring to FIG. 12, a flowchart of a method 1200 for making calibrated tapes is shown according to one approach. The method 1200 may be performed in accordance with the present disclosure in any of the environments depicted in FIGS. 1-11, among others, in various approaches. For example, a tape calibrated according to method 1200 may be used to calibrate a tape drive using method 1100 of FIG. 11. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various approaches, the method 1200 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

Method 1200 begins with optional operation 1202 of preheating a tape to a selected temperature, e.g., a temperature corresponding to a steady state temperature within the drive used in method 1200, to equilibrate the tape.

Operation 1204 includes loading a tape cartridge into a tape drive, the tape drive having a module of known servo reader span at a particular temperature.

Operation 1206 includes optionally allowing the tape to equilibrate in the drive, and then taking servo track span measurements along a portion of the tape. In one approach, the measurement is taken preferably in an inner data band and along at least one wrap therein. The length of the tape may be similar to lengths of tape described elsewhere herein.

Operation 1208 includes computing an average of the servo track span measurements.

Operation 1210 includes calculating a difference between the average of the servo track span measurements and the known servo reader span. In one approach, the known reader span is retrieved from the VPD of the drive performing this operation, or any source of such information.

Operation 1212 includes repeating operation 1210 at least once, and comparing the two measurements (differences).

At decision 1214, a determination is made as to whether the measurements compared in operation 1212 have converged to within a predefined range, e.g., a difference between the measurements is below a predefine value such as 5 nm.

Operation 1216 includes storing the difference calculated in operation 1210, preferably after convergence. The value is stored in association with the tape, e.g., in the cartridge memory of the cartridge housing the tape, on the tape itself, in a database, etc. In one approach, a derivative of the difference may be stored in association with the tape. In various approaches, the difference or derivative of the difference may be stored in the cartridge memory, on the tape itself, etc.

In various approaches, the method 1200 is an iterative process. The process may be repeated to generate a sequence of outcomes, where a converged value of the sequence of outcomes may be stored in association with the tape.

In one approach, the method 1200 includes storing environmental condition data and drive condition data pertaining to the average of the servo track span measurements.

According to one aspect, a method includes checking a calibrated tape or any tape for aging (creep). Now referring to FIG. 13, a flowchart of a method 1300 for checking tapes for aging is shown according to one approach. The method 1300 may be performed in accordance with the present disclosure in any of the environments depicted in FIGS. 1-12 among others, in various approaches. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various approaches, the method 1300 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

Figure 12:
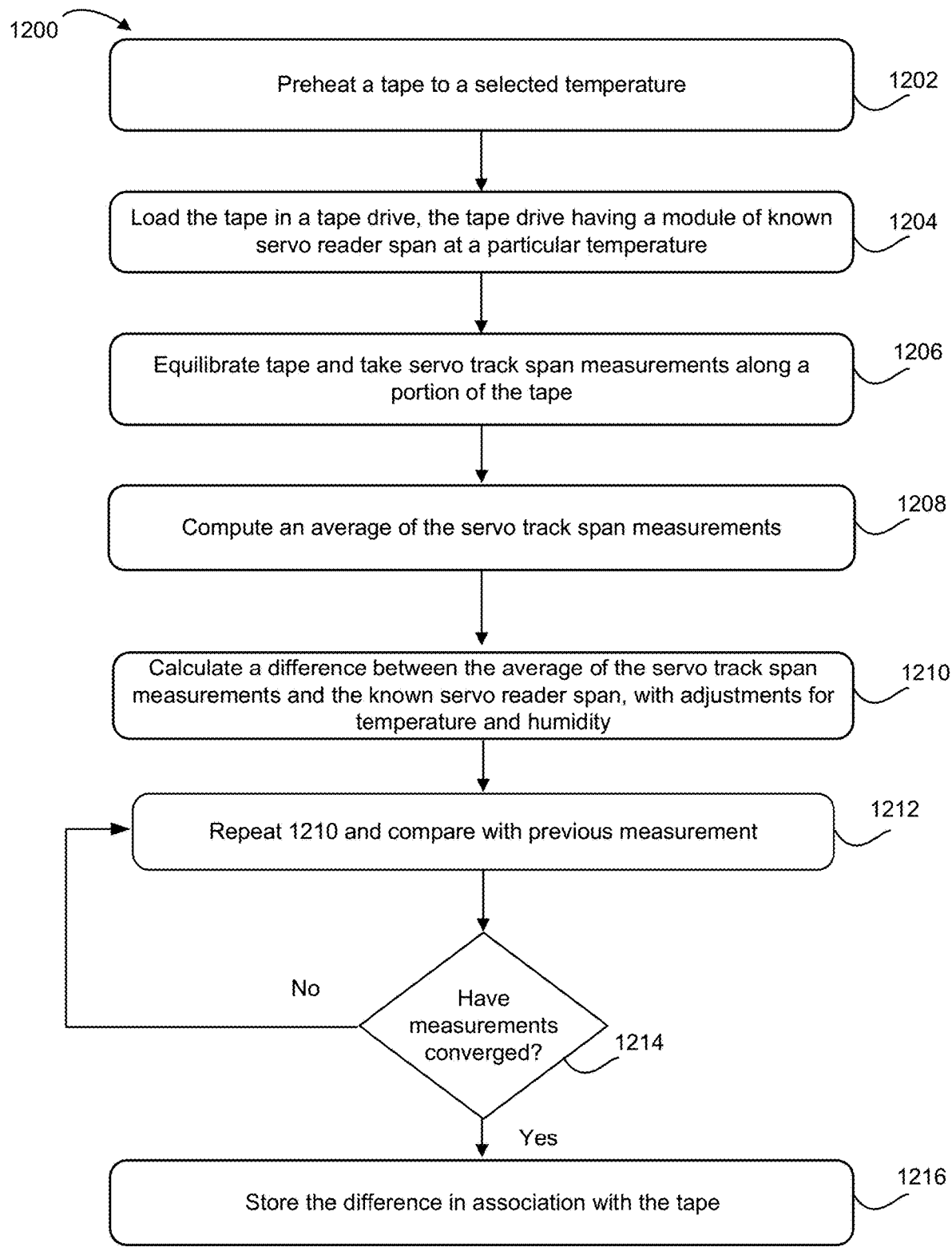
FIG. 12 is a flow chart of a method, according to one approach.
Figure 13:
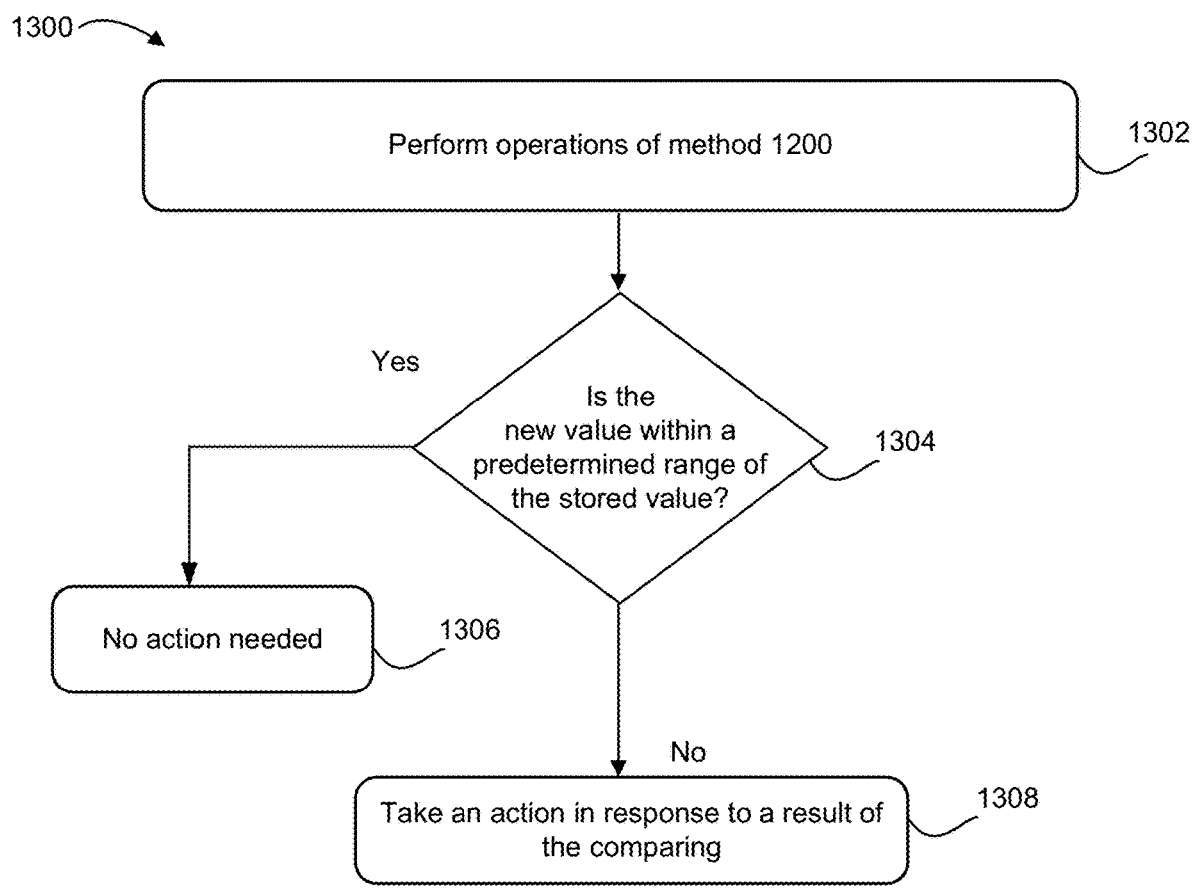
FIG. 13 is a flow chart of a method, according to one approach.

Method 1300 begins with operation 1302, which includes performing at least some of the operations of method 1200 of FIG. 12. In an approach of operation 1302 includes at least operations 1204-1208.

Operation 1304 includes determining whether the new value obtained in operation 1302 is within a predetermine range of the stored value or equivalently a value derived therefrom. In one approach, the average of the servo track span measurements computed in operation 1208 may be compared to an average servo track span derived from servo track span data created for the tape at an earlier date and retrieved from a storage location, e.g., CM. In another equivalent approach, the difference as computed in operation 1210 may be compared to a stored difference for the tape at an earlier date. The predetermined range correspond to any desired value range indicative of low or insignificant aging.

If the comparison in 1304 indicates that the new value is within the predefined range indicating insignificant aging, the process may end, an alert may be output that no action is needed, etc. See operation 1306.

Operation 1308 includes taking an action in response to a result of the comparing indicating that the difference in values is outside the acceptable range.

In one approach, the action is decommissioning the tape in response to the result of the comparing being within a predefined range. For example, the action may be decommissioning the tape when the comparing indicates substantial creep.

In another approach, the action is recalibrating the tape in response to the result of the comparing being outside the predefined range. For example, in one approach, the rewriting the cartridge memory data may be in response to when the comparing indicates moderate creep. This may include recalibrating the tape, according to the foregoing method (method 1100 of FIG. 11).

In some approaches, if the reference drive has the target head span, no correction is needed. If it does not, then a correction can be made to compensate for the difference between the reference drive's span and the target.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some approaches, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various approaches of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer.

The inventive concepts disclosed herein have been presented by way of example to illustrate the myriad features thereof in a plurality of illustrative scenarios, approaches, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various approaches have been described above, it should be understood that they have been presented by way of example only, and not limitation. Thus, the breadth and scope of an aspect of the present invention should not be limited by any of the above-described exemplary approaches, but should be defined only in accordance with the following claims and their equivalents.

What is claimed is:

1. A tape cartridge, comprising:
a tape formatted with a servo pattern having at least two servo tracks thereon; and
the tape cartridge having stored therein a value corresponding to a difference between a specified distance between adjacent servo tracks and an average distance between adjacent servo tracks on the tape,
wherein the average distance is an average of actual distances between adjacent servo tracks over a portion of the tape.

2. A tape cartridge as recited in claim 1, wherein the specified distance is a specification.

3. A tape cartridge as recited in claim 1, wherein the portion is a length of the tape that is shorter than a total length of the tape.

4. A tape cartridge as recited in claim 1, wherein a total length of the tape is less than about 400 meters.

5. A tape cartridge as recited in claim 1, wherein the value is for a single data band.

6. A tape cartridge as recited in claim 5, wherein the servo pattern includes encoding for delimiting the portion of the tape.

7. A tape cartridge as recited in claim 5, wherein the value is for a single wrap in the single data band along the portion of the tape.

8. A tape cartridge as recited in claim 5, wherein the value is for a predefined number of wraps in the single data band along the portion of the tape, wherein the predefined number of wraps is greater than one.

9. A tape cartridge as recited in claim 5, wherein the single data band is an inner data band sandwiched between other data bands.

10. A tape cartridge as recited in claim 1, wherein the portion of the tape is positioned along a neutral area of the tape.

11. A tape cartridge as recited in claim 1, wherein the tape cartridge having stored therein environmental condition data and drive condition data pertaining to the average distance.

12. A tape cartridge as recited in claim 11, wherein the environmental condition data includes information selected from the group consisting of: temperature and humidity.

13. A tape cartridge as recited in claim 11, wherein the drive condition data includes tape tension.

14. A tape cartridge as recited in claim 1, wherein a servo track span of the tape is derived from an average measurement of servo reader span of a plurality of modules.

15. A tape cartridge as recited in claim 1, wherein a servo track span of the tape is a derived from an actual servo reader span of a module.

16. A tape cartridge as recited in claim 11, wherein the environmental condition data includes coefficients for rates of change of the specified distance with at least one condition selected from the group consisting of: temperature, humidity and tape tension.

17. A tape cartridge as recited in claim 1, wherein the tape has a substrate that comprises aramid.

18. A computer program product for calibrating a tape drive, the computer program product comprising a computer readable storage medium having program instructions embodied therewith, wherein the computer readable storage medium is not a transitory signal per se, the program instructions executable by a computer to cause the computer to perform a method comprising:
taking, by the computer, a measurement of a servo track span of a tape using a module of a tape drive running the tape, wherein the tape has stored therewith data of an average servo track span of a portion of the tape;
calculating, by the computer, a value by comparing the measurement of the servo track span to the average servo track span; and
storing, by the computer, the value in memory.

19. A computer program product for calibrating a tape, the computer program product comprising a computer readable storage medium having program instructions embodied therewith, wherein the computer readable storage medium is not a transitory signal per se, the program instructions executable by a computer to cause the computer to perform a method comprising:
- taking, by the computer, servo track span measurements along a portion of the tape, wherein the tape has been loaded in a tape drive having a module of known servo reader span;
- computing, by the computer, an average of the servo track span measurements;
- calculating, by the computer, a difference between the average of the servo track span measurements and the known servo reader span; and
- storing, by the computer, the difference in association with the tape.

20. A computer program product as recited in claim 19, comprising, storing, by the computer, environmental condition data and drive condition data pertaining to the average of the servo track span measurements.

21. A computer program product as recited in claim 19, further comprising, prior to taking servo track measurements, causing by the computer, heating of the tape to a known temperature.

22. A computer program product for checking a tape for aging, the computer program product comprising a computer readable storage medium having program instructions embodied therewith, wherein the computer readable storage medium is not a transitory signal per se, the program instructions executable by a computer to cause the computer to perform a method comprising:
- taking, by the computer, servo track span measurements along a portion of the tape, wherein the tape has been loaded in a tape drive having a module of known servo reader span;
- computing, by the computer, an average of the servo track span measurements;
- comparing, by the computer, the computed average of the servo track span measurements to an average servo track span derived from servo track span data created for the tape at an earlier date; and
- taking, by the computer, an action in response to a result of the comparing.

23. A computer program product as recited in claim 22, wherein the action is decommissioning the tape in response to the result of the comparing being within a predefined range.

24. A computer program product as recited in claim 22, wherein the action is rewriting the tape in response to the result of the comparing being within a predefined range.

25. A computer program product as recited in claim 22, wherein the action is to pass the tape if the aging is insignificant.

* * * * *